(12) United States Patent
Sakurai et al.

(10) Patent No.: US 6,727,640 B2
(45) Date of Patent: Apr. 27, 2004

(54) GLASS BULB FOR A CATHODE-RAY TUBE AND A CATHODE-RAY TUBE DEVICE

(75) Inventors: Hiroshi Sakurai, Takatsuki (JP); Hiromi Wakasono, Takarazuka (JP); Masaya Kyono, Nagahama (JP); Koji Kuwahara, Nagahama (JP)

(73) Assignees: Matsushita Electric Industrial Co., Ltd., Osaka-fu (JP); Nippon Electric Glass Co., Ltd., Shiga-ken (JP)

( * ) Notice: Subject to any disclaimer, the term of this patent is extended or adjusted under 35 U.S.C. 154(b) by 145 days.

(21) Appl. No.: 09/850,333

(22) Filed: May 7, 2001

(65) Prior Publication Data

US 2001/0043041 A1 Nov. 22, 2001

(30) Foreign Application Priority Data

May 15, 2000 (JP) ........................................ 2000-142455

(51) Int. Cl.[7] ................................................ H01J 29/86
(52) U.S. Cl. ............................... 313/477 R; 220/2.1 R; 220/2.1 A
(58) Field of Search ............................ 313/477 R, 634, 313/493; 220/2.1 R, 2.2, 2.3 A, 2.1 A; 428/34.1

(56) References Cited

U.S. PATENT DOCUMENTS

| 2,160,434 A | * | 5/1939 | Harris ..................... 220/2.1 A |
| 4,656,388 A | * | 4/1987 | Strauss ................... 313/477 R |
| 5,547,409 A | | 8/1996 | Nakamura et al. |

FOREIGN PATENT DOCUMENTS

| JP | 5474063 | 5/1979 |
| JP | 5657463 | 5/1981 |
| JP | 4294030 | 10/1992 |
| JP | 7192625 | 7/1995 |
| JP | 8138579 | 5/1996 |
| JP | 1186754 | 3/1999 |

* cited by examiner

Primary Examiner—Ashok Patel

(57) ABSTRACT

In a disclosed glass bulb for a cathode-ray tube (CRT), a funnel unit have a less depth than a conventional one. The glass bulb for the CRT includes a panel unit having a panel screen, a neck unit holding an electron gun, and a funnel unit having a funnel-like shape, and the panel unit and the neck unit are bridged by the funnel unit. In the glass bulb, the funnel unit is formed from a plurality of glass members and a maximum-to-minimum thickness ratio of each of the plurality of glass members is designed to be within a range suitable for producing the glass members using pressing.

10 Claims, 4 Drawing Sheets

GLASS BULB FOR A CATHODE-RAY TUBE AND A CATHODE-RAY TUBE DEVICE

This application is based on Patent Application No. 2000-142455 filed in Japan, the content of which is hereby incorporated by reference.

BACKGROUND OF THE INVENTION

(1) Field of the Invention

The present invention relates to a glass bulb for a cathode-ray tube (hereafter called "CRT"), and a CRT device equipped with a CRT glass bulb.

(2) Description of Related Art

In general, a CRT device is roughly made up of a CRT glass bulb and a number of members attached to outside of the glass bulb. The CRT glass bulb is made by integrating a plurality of glass members which include a phosphor screen, an internal electrode film, or the like and sealing with an electron gun that emits an electron beam in high vacuum. The number of members includes a deflection yoke to deflect the electron beam. The construction of the conventional CRT glass bulb is briefly described below.

FIG. 1 is a schematic sectional view to show an example construction of the conventional CRT glass bulb. As shown in the figure, the conventional CRT glass bulb is made by integrating a glass member 901 that forms a panel unit, a glass member 902 that forms a funnel unit, and a glass member 903 that forms a neck unit, and sealing with a glass frit or heat fusing. On an inner surface of the glass bulb, an internal electrode film 906 is formed and connected to an anode button 907 in a conductive state. The anode button 907 are extended to the outside of the glass bulb through the funnel unit glass member 902.

When compared with other types of display devices that have developed in recent years such as a liquid crystal display panel and a plasma display panel, a CRT device has a large depth, which is a major drawback. Therefore, reducing the depth is one of the important issues in developing CRT devices. However, to reduce the depth of the CRT device equipped with the glass bulb described above, mainly a depth L2 of the funnel unit has to be reduced.

The conventional funnel unit glass member 902 is formed in one piece using pressing. Accordingly, reducing the depth of the funnel unit glass member 902 deteriorates vacuum strength and implosion-proof of the glass bulb. Therefore, the reduction of the depth of the funnel unit has already reached its limits due to the design constraints on the strength.

SUMMARY OF THE INVENTION

An object of the present invention is to provide a glass bulb for a CRT whose funnel unit have a less depth than a conventional one and a CRT device equipped with the CRT glass bulb.

First, the circumstances which led the inventors to the present invention is described. In forming the funnel unit in one piece as explained in the related art, the inventors designed a prototype of a funnel unit glass member 902 to reduce the depth of the funnel unit and at the same time to improve vacuum strength and implosion-proof. However, the prototype was broken in the pressing process and ended in failure.

The inventors examined the cause of the failure and made the following assumption. The funnel unit glass member 902 and a panel unit glass member 901 are joined at a sealed portion. Here, the sealed portion indicates a portion where two glass members are joined by sealing. Therefore, the thickness of the portion of the funnel unit glass member 902 which is to be joined to the panel unit glass member 901 needs to be substantially the same as the thickness of the portion of the panel unit glass member 901 which is to be joined to the funnel unit glass member 902. In consideration of (a) the strength of a seal used for sealing the sealed portion and (b) increase of stress to the sealed portion caused by reducing the depth of the funnel unit, the sealed portion between the panel unit glass member 901 and the funnel unit glass member 902 is preferably as thick as 15 mm to 30 mm.

On the other hand, in a sealed portion between the funnel unit glass member 902 and a neck unit glass member 903, thickness of the portion of the funnel unit glass member 902 which is to be joined to the neck unit glass member 903 also needs to be substantially the same as the thickness of the portion of the neck unit glass member 903 which is to be joined to the funnel unit glass member 902. However, members such as a deflection yoke for deflecting an electron beam have to be provided around the sealed portion. Hence, it is necessary to make the sealed portion thin in order to increase the magnetic flux density of the deflection yoke.

Consequently, the conventional funnel unit glass member 902 needs to be approximately 15–30 mm thick at the portion which is to be joined to the panel unit glass member 901 and approximately 2–3 mm thick at the portion which is to be joined to the neck unit glass member 903. When the funnel unit is formed from a single glass member, a maximum-to-minimum thickness ratio of the funnel unit glass member 902 is approximately 10:1.

The inventors assumed that the prototype of the funnel unit glass member was broken because such a large maximum-to-minimum thickness ratio of the funnel unit glass member 902 caused the difference in cooling rates during the pressing process between the thickest portion and the thinnest portion of the funnel unit glass member 902. In other words, if the maximum-to-minimum thickness ratio had been set within a certain range, it would have been possible to make the sealed portion between the funnel unit glass member 902 and the panel unit glass member 901 sufficiently thick.

Based on the above assumption, the inventors has invented a glass bulb for a cathode-ray tube including: a panel unit having a panel screen; a neck unit holding an electron gun; and a funnel unit having a funnel-like shape, wherein the panel unit and the neck unit are bridged by the funnel unit, wherein the funnel unit is formed from a plurality of glass members, the plurality of glass members including at least a first glass member on a side of the panel unit and a second glass member on a side of the neck unit, and wherein a maximum-to-minimum thickness ratio of each of the plurality of glass members is designed to be within a range suitable for producing the plurality of glass members using pressing, the maximum-to-minimum thickness ratio being a ratio of thickness of a thickest portion to thickness of a thinnest portion.

With this construction, the portion of the funnel unit glass member 902 which is to be joined to a panel unit glass member 901 can be made thicker enough to improve the vacuum strength and the implosion-proof while reducing the depth of the funnel unit. Here, the range of the maximum-to-minimum thickness ratio suitable for producing the glass members using pressing is likely to vary depending on which type of glass material is used. For example, when a glass material conforming to EIAJ (Electronic Industries Association of Japan)·LOF-03 is used, the inventors found that the maximum thickness needs to be no more than about five times the minimum thickness.

Also, the inventors examined to use strengthened glass for the funnel unit in order to further improve the vacuum strength and the implosion-proof. The physical strengthening can be performed by air-cooling the glass member molded by pressing, heating it again to a temperature which is 20–40° C. lower than an annealing point, and cooling it slowly.

The inventors confirmed that if the maximum-to-minimum thickness ratio is in the suitable range for producing the glass member using pressing, it is possible to physically strengthen the glass member.

Therefore, by physically strengthening at least one glass member out of the plurality of glass members which form the funnel unit, strengthened glass can be used in at least part of the funnel unit. As a result, even if the depth of the funnel unit is reduced, the vacuum strength and the implosion-proof can be improved.

Here, the plurality of glass members that form the funnel unit is preferably joined by sealing with a glass frit so that the inside of the glass bulb is kept in a vacuum state. This is because, under the present circumstances, it is not preferable to use a method such as fusion sealing to seal strengthened glass.

Also, the funnel unit is formed from two glass members: a glass member to be joined to the panel unit grass member and a glass member to be joined to a neck unit glass member. The former funnel unit glass member and the latter funnel unit glass member are preferably joined at a position including an inflection point on a periphery of the funnel unit on a supposed plane substantially perpendicular to the tube axial direction. In consideration of a general shape of a glass bulb, the thickness of the glass bulb changes most sharply around the position. If the funnel unit is cut at the position, it can be efficiently divided into a thick glass member and a thin glass member. Also, the glass members with such shapes are easy to produce. Furthermore, each area of the sealed portion is sufficiently large. Therefore, this construction is preferable in consideration of the strength of the integrated glass bulb.

Also, when a shape of an original member to form the funnel unit glass member which is to be joined to the panel unit glass member is substantially the same as a shape of the panel unit glass member, it is possible to attempt to reduce a cost of a mold for molding the glass member. Here, "the shape of the original member" indicates the shape of the panel unit glass member when a shape of the funnel unit glass member is substantially the same as a shape in which a certain portion is removed from the panel unit glass member.

Among the plurality of glass members that form the funnel unit, the glass member which is to be joined to the panel unit glass member is preferable to be formed in one piece and physically strengthened. With this construction, strengthened glass is used around a sealed portion between the panel unit and the funnel unit. As a result, the sealed portion can be thinner, and the glass bulb can be lightened.

The glass bulb has a lead terminal connected to each internal electrode film which is provided on an inner surface of the funnel unit. The lead terminal is preferably extended to the outside of the glass bulb through a sealed portion between two out of the plurality of funnel unit glass members. In the conventional method, the lead terminal is provided so as to pass through the funnel unit glass member by heating part of it. However, for example, when all the funnel unit glass members are physically strengthened, the conventional method cannot be used because it is not preferable to heat strengthened glass to pass the lead terminal through the funnel unit glass members under the present circumstances.

Also, it is preferable to physically strengthen the panel unit glass member, so that the whole glass bulb is strengthened.

Moreover, the object is achieved by a glass bulb for a CRT including: a panel unit having a panel screen; a neck unit holding an electron gun; and a funnel unit having a funnel-like shape, wherein the panel unit and the neck unit are bridged by the funnel unit, and wherein physically strengthened glass is used in at least part of the funnel unit.

The object is further achieved by a manufacturing method of a glass bulb for a CRT including: a panel unit having a panel screen; a neck unit holding an electron gun; and a funnel unit having a funnel-like shape, wherein the panel unit and the neck unit are bridged by the funnel unit, the manufacturing method including: a glass member preparing step for preparing at least one physically strengthened glass member for the funnel unit, the funnel unit being formed from a plurality of glass members; and a glass bulb forming step for forming the glass bulb from the plurality of glass members including the glass member which is prepared in the glass member preparing step. Here, in the glass member preparing step, the glass members may be prepared by buying as well as by producing.

Additionally, the object is achieved by a CRT device equipped with the glass bulb of the present invention or the glass bulb produced according to the manufacturing method of the present invention.

BRIEF DESCRIPTION OF THE DRAWINGS

The object, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

A preferred embodiment of a glass bulb for a CRT and a CRT device of the present invention is described with the drawings below.

Figure 1:
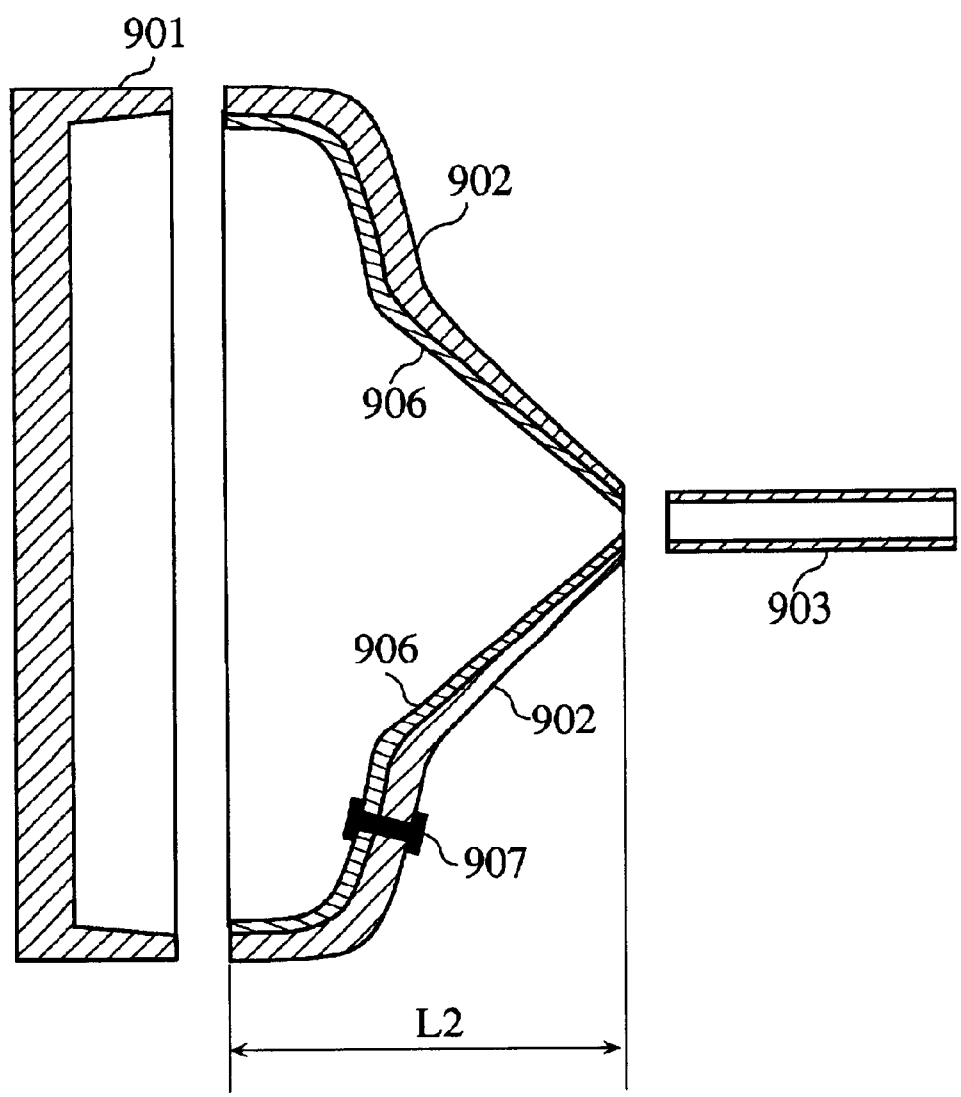
FIG. 1 is a schematic sectional view to show an example construction of a conventional CRT glass bulb.
Figure 2:
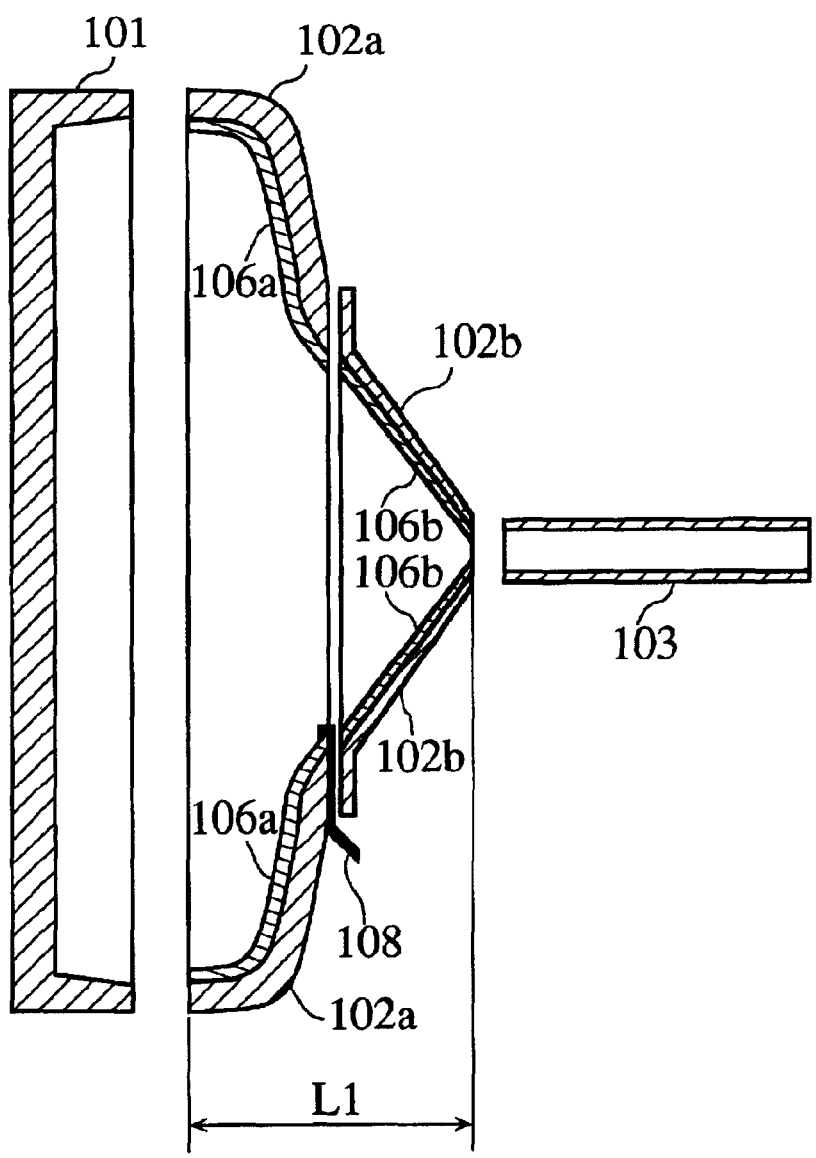
FIG. 2 is a schematic sectional view showing a construction of a glass bulb for a CRT in an embodiment of the present invention.

FIG. 2 is a schematic sectional view showing an example construction of the CRT glass bulb of the present embodiment. As shown in the figure, the glass bulb is made by integrating a panel unit glass member 101, two funnel unit glass members 102a and 102b, and the neck unit glass member 103. The funnel unit glass member 102a is to be joined to the panel unit glass member 101, and the funnel unit glass member 102b is to be joined to a glass member 103 for a neck unit. A lead terminal 108 which is connected to internal electrode films 106a and 106b in a conductive state is provided between the two funnel unit glass members 102a and 102b and extended to the outside of the glass bulb.

Here, the internal electrode films 106a and 106b are formed through a general procedure using brushing or pouring a material made mainly from carbon and liquid glass, and they may be formed either of before or after the funnel unit glass members 102a and 102b are joined.

A general material which is used for a vacuum tube can be used for the lead terminal 108. The general material is conductive and has a higher melting point than a softening point of glass which is used for the funnel unit glass members 102a and 102b. For example, an alloy of nickel, chromium, and iron whose coefficient of thermal expansion is similar to that of glass can be used. Here, the lead terminal 108 is preferably as small and thin as possible because the inside of the glass bulb has to be kept in a vacuum state.

The panel unit glass member 101 and the funnel unit glass member 102a, and the funnel unit glass member 102b and the neck unit glass member 103 are joined by respective predetermined methods. Then, an electron gun and the like (unshown in the figure) are provided on the inner surface of the joined glass members. And finally, it is sealed in high vacuum. The glass bulb produced in this way is provided as a member of a CRT device. Here, in the present embodiment, the shapes of the funnel unit glass members 102a and 102b are adjusted so that an sectional area of a sealed portion is sufficiently large to be sealed using a glass frit such as a frit glass 1307 R made by ASAHI GLASS Company Ltd. Here, the sealed portion indicates a portion where two glass members are joined by sealing. As for the shape of each joined portion, an end of the funnel unit glass member 102b, which is to be joined to the funnel unit glass member 102a, may be bent to outside of the glass bulb so that a surface of the bent portion can be joined to an end of the funnel unit glass member 102a. Also, both joined portions of the funnel unit glass members 102a and 102b may be shaped a cuneiform. Both methods provide sufficiently large areas. Here, the preferable areas of the joined portions are likely to vary depending on other conditions, so that they need to be decided in each case in consideration of the conditions.

In the present embodiment, the funnel unit glass members 102a and 102b are designed so that each maximum-to-minimum thickness ratio is in a suitable range for producing the glass members using pressing. With this, the sealed portion between the funnel unit glass members 102a and the panel unit glass member 101 can be sufficiently thick, so that the depth of the funnel unit can be reduced. The range of the maximum-to-minimum thickness ratio is likely to vary depending on a type of glass material or the like. When using a glass material described later, the inventors confirmed that when the maximum thickness is designed to be no more than substantially five times the minimum thickness, the glass members can be produced using pressing and also physically strengthened.

Figure 3:
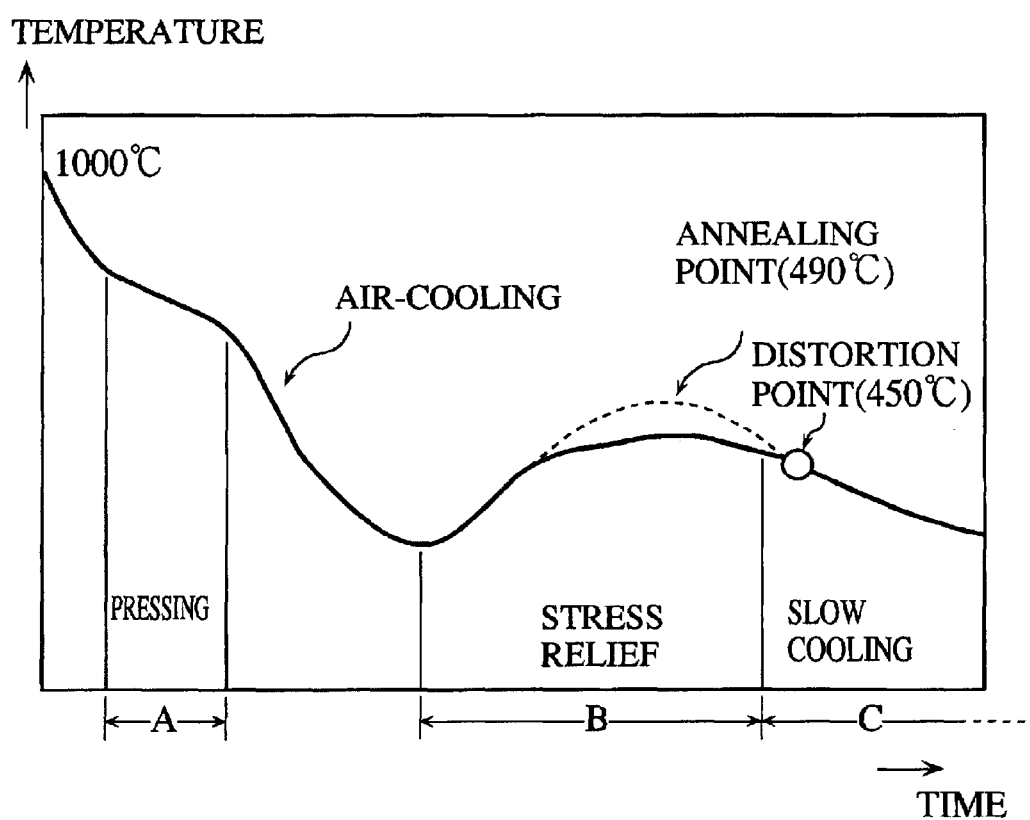
FIG. 3 shows the relationship between process timings and glass temperatures when producing a glass member to be physically strengthened, in the embodiment of the present invention.

A manufacturing method of the funnel unit glass members 102a and 102b using pressing and a physical strengthening method are described with FIG. 3. FIG. 3 shows the relationship between process timings and glass temperatures when producing a glass member to be physically strengthened in the present embodiment.

In the present embodiment, glass which is heated to approximately 1000° C. and melted is molded an end shape by pouring into a mold and pressing (A in the figure). Then, the glass member is air-cooled, that prevents deformation and significantly strengthens the glass member. Next, the glass member is heated again to 450–470° C. in an electric furnace or the like (B in the figure), which is 20–40° C. lower than an annealing point (approximately 490° C.). The highest temperature in heating determines physical strength of the glass member because the physical strength depends on a gradient of a temperature curve at the distortion point in the slow cooling process.

As described above, as the maximum-to-minimum thickness ratio becomes larger, a difference of cooling rates between the thick portion and the thin portion becomes larger. Accordingly, a problem such as a crack or deformation can occur. Therefore, in the present embodiment, the problem is prevented by designing the funnel unit glass member on a condition that the maximum-to-minimum thickness ratio is in a suitable range for producing the glass member using pressing.

For example, when using a glass material consisting of 23% of PbO, 56% of $SiO+Al_2O_3$, 7% of MgO+CaO, and 14% of $Na_2O+K_2O$, such as a material conforming to EIAJ·LOF-03, both of pressing and physical strengthening are possible on a condition that the maximum thickness is no more than substantially five times the minimum thickness. Here, the funnel unit glass member is physically strengthened approximately by 40 percent. Therefore, vacuum strength and implosion-proof can be improved even if the depth of the funnel unit is reduced. When producing a glass bulb for a 32-inch CRT, the depth was reduced approximately 20–30 mm. The thickest portion of the funnel unit glass member 102a was on the side of the panel unit glass member 901 and measured 24.5 mm thick; and the thinnest portion was on the side of the funnel unit glass member 102b and measured 12.5 mm thick. Then the maximum-to-minimum thickness ratio of the funnel unit glass member 102a was 1.96. And the thickest portion of the funnel unit glass member 102b was on the side of the funnel unit glass member 102a and measured 11.0 mm; and the thinnest portion was on the side of the neck unit glass member 103 and measured 2.54 mm thick. Then the maximum-to-minimum thickness ratio of the funnel unit glass member 102b was approximately 4.3.

The glass bulb explained above is added by the deflection yoke, a convergence yoke, adjusting coils, and a variety of circuits to produce a CRT device that can display images. The description of the manufacturing method of the CRT device is omitted because a conventional manufacturing method can be used.

Modifications

Although the preferred embodiment of the present invention has been described, it is to be noted that the present invention is not limited to the embodiment described above. The embodiment can be modified as followings.

(1) Although the funnel unit is divided into two funnel unit glass members 102a and 102b in the above embodiment, the number of the funnel unit glass members do not limit to two, and the number may be larger. However, in order to keep the inside of the glass bulb in a vacuum state, a smaller number is generally more preferable.

Also, although the lead terminal 108 is extended to the outside of the glass bulb through the sealed portion between the two funnel unit glass members because they are intended to be physically strengthened, part of the funnel unit, which is less tensed, is left unstrengthened to be provided with an anode button used in the conventional glass bulb.

When the funnel unit is formed from a plurality of glass members, the funnel unit may be divided into a variety of shapes of glass members. As shown in FIG. 2, it is preferably divided at a position including an inflection point on a periphery of the funnel unit on a supposed plane substantially perpendicular to the tube axial direction. In consideration of a general shape of a glass bulb, the thickness of the glass bulb changes most sharply around the position. If the funnel unit is cut at the position, it can be efficiently divided into a thick glass member and a thin glass member. Also, the glass members with such shapes are easy to produce. Furthermore, each area of the sealed portions is sufficiently large. Therefore, this construction is preferable in consideration of the strength of the integrated glass bulb.

(2) Although the plurality of funnel unit glass members are joined using a glass frit in the above embodiment, the joining method is not limited to the joining using the glass frit, and other joining methods can be used as long as the inside of the glass bulb is kept in highly vacuum state. Metal such as indium, other adhesives, or seals can be thought as alternatives. In addition, if a technique of processing glass surface progresses, they might be able to be joined using nothing.

Unstrengthened glass members may be joined by fusion sealing as conventional. This method also maybe used when the sealed portion between the glass members is not physically strengthened.

(3) The panel unit glass member may be physically strengthened. A material including 64% of $SiO+Al_2O_3$, 19% of $SrO+BaO+ZnO$, and 15% of $Na_2O+K_2O$ such as H8602, H8001, H7302, and H5702 in EAIJ can be used as a glass material for the panel unit glass member. The physical strengthening can be performed by the above method, so that the whole glass bulb can be physically strengthened.

Figure 4:
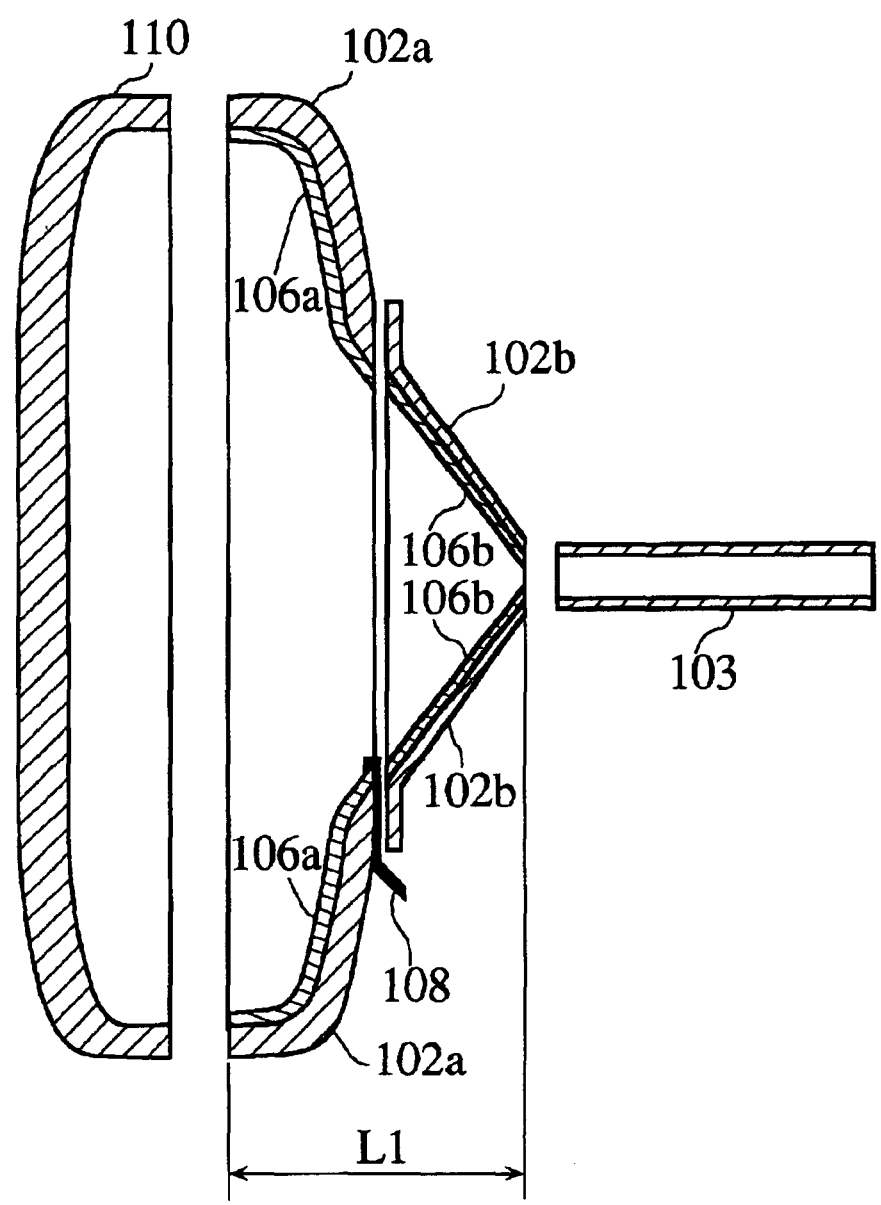
FIG. 4 is a schematic sectional view showing a construction of a glass bulb for a CRT, when the original member of a glass member for a funnel unit is shaped substantially the same as a glass member for a panel unit.

(4) As shown in FIG. 4, a shape of an original member of the funnel unit glass member 102a can be substantially the same as the panel unit glass member 110. Here, "the shape of the original member" indicates the shape of the panel unit glass member when a shape of the funnel unit glass member 102a is substantially same as a shape in which a certain portion is removed from the panel unit glass member 110. With this, it is possible to attempt to reduce a cost of a mold for molding the glass member. When a panel face is flat, the shape of the original member of the funnel unit glass member 102a can be substantially the same as the panel unit glass member 101 in FIG. 2.

(5) Although the physical strengthening is performed by air-cooling a glass member molded by pressing, heating it again 450–470° C., and cooling it slowly in the above embodiment, the physical strengthening method is not limited to such a method, and different methods may be used. However, if a different method is used, it is preferable to determine, by experiment or the like, the type of a glass material and the maximum-to-minimum thickness ratio suitable for producing the glass member using pressing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A glass bulb for a cathode-ray tube comprising: a panel unit having a panel screen; a neck unit holding an electron gun; and a funnel unit having a funnel-like shape, wherein the panel unit and the neck unit are bridged by the funnel unit, wherein the funnel unit is formed from a plurality of glass members, the plurality of glass members including at least a first glass member on a side of the panel unit and a second glass member on a side of the neck unit, and a maximum-to-minimum thickness ratio of each of the plurality of glass members is designed to be within a range suitable for producing the plurality of glass members using pressing, the maximum-to-minimum thickness ratio being a ratio of thickness of a thickest portion to thickness of a thinnest portion.

2. The glass bulb of claim 1, wherein the plurality of glass members are prepared by using a glass material conforming to EIAJ (Electronic Industries Association of Japan) LOF-03, and in each of the plurality of glass members, the maximum thickness is no more than substantially five times the minimum thickness.

3. The glass bulb of claim 1, wherein at least one of the plurality of glass members is designed to be physically strengthened.

4. The glass bulb of claim 3, wherein the physical strengthening is performed by air-cooling a glass member molded by pressing, heating the glass member again to a temperature which is 20–40 C.° lower than an annealing point, and cooling the glass member slowly.

5. The glass bulb of claim 1, wherein the plurality of glass members are joined by sealing with a glass frit so that inside of the glass bulb is kept in a vacuum state.

6. The glass bulb of claim 1, wherein the funnel unit is formed from two glass members, which are (a) the first glass member to be joined to the panel unit and (b) the second glass member to be joined to the neck unit, the panel unit and the neck unit being made of a glass material, and wherein the first glass member and the second glass member are joined at a position including an inflection point on a periphery of the funnel unit on a supposed plane substantially perpendicular to a tube axial direction.

7. The glass bulb of claim 6, wherein the first glass member has substantially a same shape as a shape in which a certain portion is removed from the panel unit.

8. The glass bulb of claim 1, wherein the first glass member which is to be joined to the panel unit is formed in one piece and designed to be physically strengthened, the panel unit being made of a glass material.

9. The glass bulb of claim 1, wherein a lead terminal is (a) connected to an electrode formed on an inner surface of the funnel unit and (b) extended to outside of the glass bulb through a sealed portion, the sealed portion being where at least two out of the plurality of glass members are joined.

10. The glass bulb of claim 1, wherein a panel unit glass member that forms the panel unit is designed to be physically strengthened.

* * * * *